United States Patent [19]
Pfeiffer et al.

[11] Patent Number: 5,629,925
[45] Date of Patent: May 13, 1997

[54] METHOD OF OPERATING A SWITCHING NETWORK, AS WELL AS SWITCHING NETWORK AND EXCHANGE THEREFOR

[75] Inventors: Bodo Pfeiffer; Stefan Wahl, both of Schwieberdingen, Germany

[73] Assignee: Alcatel SEL Aktiengesellschaft, Stuttgart, Germany

[21] Appl. No.: 429,719

[22] Filed: Apr. 27, 1995

[30] Foreign Application Priority Data

Apr. 29, 1994 [DE] Germany .................. 44 15 016.4

[51] Int. Cl.⁶ .................. H04G 11/00; H04J 3/02
[52] U.S. Cl. .................. 370/217; 370/388; 340/827
[58] Field of Search .................. 370/13, 16, 16.1, 370/58.1, 58.2, 58.3, 60, 60.1, 94.1, 94.2; 340/826, 827

[56] References Cited

U.S. PATENT DOCUMENTS

| | | | |
|---|---|---|---|
| 4,654,842 | 3/1987 | Coraluppi et al. | 370/16 |
| 4,679,186 | 7/1987 | Lea | 370/16 |
| 4,989,022 | 1/1991 | Hwang et al. | 340/827 |
| 5,200,746 | 4/1993 | Yoshifuji | 340/826 |
| 5,471,460 | 11/1995 | Tanabe | 370/16 |

*Primary Examiner*—Wellington Chin
*Assistant Examiner*—Soon Dong Hyun
*Attorney, Agent, or Firm*—Ware, Fressola, Van Der Sluys & Adolphson LLP

[57] ABSTRACT

A method of operating a switching network, a switching network, and an exchange with such a switching network are described. The switching network consists of several switching modules and an interconnect network between these switching modules. The interconnect network includes a switch unit and interconnects the switching modules in accordance with a logic interconnection structure. The switch unit is simple and can be implemented by all-optical means. By means of the switch unit the logic interconnection structure can be reconfigured. This makes it possible to reconfigure the switching network in the event of a failure of a switching module or according to the load characteristic (video, voice, computer-computer communication). Further, a uniform switch unit can be used to meet different requirements ("flexible hardware").

7 Claims, 2 Drawing Sheets

METHOD OF OPERATING A SWITCHING NETWORK, AS WELL AS SWITCHING NETWORK AND EXCHANGE THEREFOR

TECHNICAL FIELD

The present invention relates to a method of operating a switching network, to a switching network, and to an exchange.

BACKGROUND OF THE INVENTION

The invention starts from a switching network as is described in an article by M. A. Henrion et al, "Switching Network Architecture for ATM Based Broadband Communications", XIII International Switching Symposium, June 1990, Vol. V, pages 1–8.

That article describes a three-stage switching network in which multiple paths are possible for a connection from an input link to an output link. Each stage of the switching network consists of several switching modules, and each switching module is equivalent to a 128×128 switching matrix or a 32×32 switching matrix. The first stage is formed by a number of switching modules connected in parallel, which are called "access switches". These switching modules are designed to evenly distribute the traffic to the subsequent stages of the switching network. The switching function proper is performed by the other two stages, which also consist of a number of parallel-connected switching modules each. The switching modules of the three stages are interconnected via hard-wired paths. Each of the switching modules includes a circuit for fault detection. If this circuit detects a fault in the switching module, it will send a particular signal backward to all preceding switching modules. This signal calls upon the receiving switching module to stop sending data cells to the faulty switching module. In this manner, the faulty switching module is isolated, so that the operational capability of the switching network is preserved.

The disadvantage of this self-isolation mechanism is that in the event of a failure of a switching module, a major number of other switching modules may no longer be available for the execution of switching functions, either. Therefore, the failure of a major number of switching modules must be taken into account in dimensioning the switching network, i.e., the switching network must be correspondingly overdimensioned.

SUMMARY OF THE INVENTION

It is the object of the invention to ensure the operational capability of a switching network in the event of a failure or an overload condition of switching modules.

The basic idea of the invention is to change the structure of the interconnection of the switching modules by means of a switch unit. Thus it is possible to reconfigure the switching network on the occurrence of a fault in a switching module, thereby minimizing effects of a failure of a switching module on the other switching modules.

Further advantageous aspects of the invention are apparent from the subclaims.

The invention has the advantage that instead of a major number of switching modules, only a few switching modules need to be held in reserve. Thus, a saving is achieved with respect to the number of switching modules needed for a switching network. The additionally required switch unit can be constructed from simple and, thus, low-cost crosspoints. Such a crosspoint may be formed, for example, by a simple electric or optical switch, such as an integrated optical directional coupler.

Another advantage of the invention is that a switching network can be reconfigured during operation according to the load or load characteristic imposed on it. This, too, results in a saving of switching modules.

A further advantage is that a switching network can be reconfigured by software according to its use. The switching-network structure which is optimal for a given load characteristic, such as video, voice, or computer-computer communication, differs from load characteristic to load characteristic. So far it was necessary to construct for each load characteristic a switching network with corresponding, hard-wired links between the switching modules. With the invention, this cost-intensive hardware implementation can be avoided.

BRIEF DESCRIPTION OF THE DRAWINGS

The invention will become more apparent from the following description of an embodiment taken in conjunction with the accompanying drawings, in which.

BEST MODE FOR CARRYING OUT THE INVENTION

In the embodiment, the use of the method according to the invention in a three-stage straightforward switching network will be described, but it is to be understood that the invention can also be applied to a switching network with a totally different structure, such as a different number of stages, two or more network levels, or a reversed switching arrangement (folded network).

Figure 1:
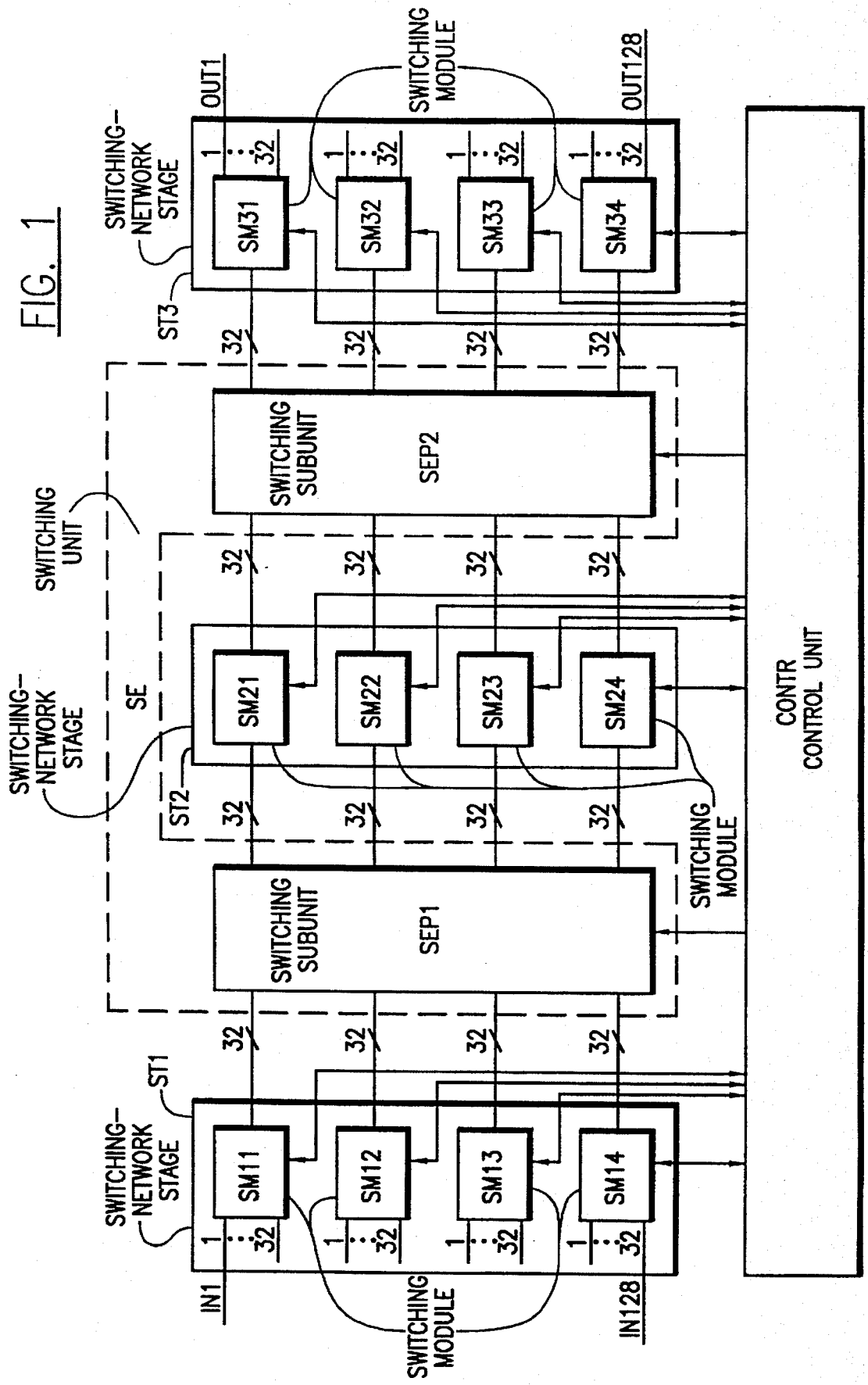
FIG. 1 is a block diagram of a switching network according to the invention.

FIG. 1 shows three switching-network stages ST1 to ST3, a switch unit SE, and a control unit CONTR. The stages ST1 and ST3 are connected to the stage ST2 via the switch unit SE. The switch unit SE receives control instructions from the control unit CONTR, and the stages ST1 to ST3 exchange data with the control unit CONTR.

Each of the switching-network stages ST1 to ST3 has 128 inlets and 128 outlets, of which only the inlets IN1 and IN128 of stage ST1 and the outlets OUT1 and OUT128 of stage ST3 are shown.

The switching network switches data cells arriving at one of the inlets IN1 to IN128 of the switching-network stage ST1 to one or more of the outlets OUT1 to OUT128 of the switching-network stage ST3. The switching function is distributed to the stages ST1 to ST3, as is generally the case with multistage switching networks. The paths between the stages ST1 to ST3 extend through the switch unit SE, so that with the latter, the interconnection structure between the stages ST1 to ST3 can be changed. The interconnection structure is the rule which describes which inlet of a switching-network stage is connected to which outlet of the preceding switching-network stage. The switch unit SE is controlled by the control unit CONTR, which changes the interconnection structure via the switch unit SE based on data that it receives from the switching-network stages ST1 to ST3.

Each of the switching-network stages ST1 to ST3 is formed by four switching modules. Stage ST1 contains four switching modules SM11 to SM14, stage ST2 four switching modules STM21 to SM24, and stage ST3 four switching modules SM31 to SM34. The switching modules of the switching network are identical in construction. Each of them has 32 inlets and 32 outlets. The inlets of switching modules SM11 to SM14 form the inlets IN1 to IN128 of stage ST1. The outlets of switching modules SM31 to SM34 form the outlets OUT1 to OUT128 of stage ST3.

It is also possible to use switching modules with a different number of inlets or outlets or to use a different number of switching modules per switching-network stage. Moreover, different numbers of switching modules or switching modules with different numbers of inlets or outlets can be used in different switching-network stages.

The switch unit SE consists of two switch subunits SEP1 and SEP2.

The 32 outlets of each of the switching modules SM11 to SM14 of stage ST1 and the 32 inlets of the switching modules SM21 to SM24 of stage ST2 are connected to the switch subunit SEP1. The 32 outlets of each of the switching modules SM21 to SM24 of stage ST2 and the 32 inlets of each of the switching modules SM31 to SM34 of stage ST3 are connected to the switch subunit SEP2. Each of the switching modules SM11 to SM14, SM21 to SM24, and SM31 to SM34 exchanges data with the control unit CONTR. Each of the two switch subunits SEP1 and SEP2 receives control instructions from the control unit CONTR.

As mentioned above, the switching modules SM11 to SM14, SM21 to SM24, and SM31 to SM34 are identical in construction. In the following, therefore, only the operation of the switching module SM11 is described by way of example.

The switching module SM11 is formed by a 32×32 ATM integrated switching element. Such a switching element is known, for example, from an article by D. Böttle and M. A. Henrion, "Das ATM-Koppelfeld von Alcatel und seine Eigenschaften", Elektrisches Nachrichtenwesen, Vol. 64, No. 2–3, 1990. Such a switching element may, in turn, consist of a number of smaller, interconnected switching elements.

The switching module SM11 switches a data cell arriving at any of its 32 inlets to one of its 32 outlets based on routing information contained in the data cell and on an internal routing table. It receives control instructions from the control unit CONTR which cause this routing table to be updated. This ensures in the event of a reconfiguration of the interconnection structure that the switching rules in the switching module SM11 are adapted to the new interconnection structure. The switching module SM11 sends to the control unit CONTR data on the traffic carried by it as well as data which indicates whether the switching module SM11 is operational or faulty. To this end, the switching module SM11 contains devices which measure the traffic carried by the switching module, detect faults within the module, and report such faults.

It is also possible that the switching module SM11 sends other or further traffic parameters to the control unit CONTR. Such traffic parameters are, for example, the carried loads of the individual inlets or outlets of the switching module SM11. The use of an ATM switching element for the switching module SM11 is only exemplary; any other switching element can be used for the switching module SM11.

The switch subunits SEP1 and SEP2 are identical in construction. In the following, therefore, only the construction of the switch subunit SEP1 is described by way of example.

The switch subunit SEP1 consists of a plurality of crosspoints which make it possible to connect any of the outlets of the switching modules SM11 to SM14 of the switching-network stage ST1 to any of the inlets of the switching modules SM21 to SM24 of the switching-network stage ST2. The crosspoints are controlled by control instructions from the control unit CONTR. Such crosspoints can be quite simple in construction, since their switching behavior is independent of the signal to be switched. For example, they need not follow the clock relations of this signal. Also, their switching times can be longer than those of the crosspoints of the switching modules.

It is particularly advantageous to use optical crosspoints in the switch unit SE and interconnect the switching modules by optical waveguides. Such crosspoints can be implemented with simple optical on/off switches.

It is also possible that the switch subunit SEP1 does not allow all possible interconnection combinations between the inlets of the switching-network stage ST2 and the outlets of the switching-network stage ST1. In that case, the number of crosspoints required would not become too great. For example, alternative interconnection structures could be provided between the switching-network stages ST1 and ST2 for particular fault or overload conditions, and only the switchable paths needed for this purpose could be made available by the switch subunit SEP1.

Furthermore, it is possible not to divide the switch unit SE into the two switch subunits SEP1 and SEP2. This would allow all possible interconnection combinations between the switching modules of all three switching-network stages ST1 to ST3. Thus, particularly in the case of switching-network configurations with a great number of switching-network stages, switching modules could be assigned alternately to different switching-network stages by changing the interconnection structure. For instance, a reserve switching module could be used in different switching-network stages if an overload or fault condition occurs there. The number of switching-network stages or switching-network levels could also be changed in this manner.

The control unit CONTR receives from the switching modules SM11 to SM14, SM21 to SM24, and SM31 to SM34 data on the traffic carried by, and the functional capability of, the individual switching modules. On the basis of this data, the control unit CONTR decides whether the interconnection structure of the switching network should be reconfigured. If the control unit CONTR has decided for such a reconfiguration, it will calculate the necessary changes in the routing tables of the switching modules SM11 to SM14, SM21 to SM24, and SM31 to SM34, and cause these changes to be made by sending corresponding control instructions to the switching modules SM11 to SM14, SM21 to SM24, and SM31 to SM34. In addition, the control unit CONTR sends to the switch subunits SEP1 and SEP2 control instructions which cause the crosspoints to be switched in accordance with the new interconnection structure.

It is also possible to supply the control unit CONTR with data from an input device. By means of this input device, the interconnection structure of the switching network can then be changed. The interconnection structure could be fixed depending on the application of the switching network, for example. Such an application is, for example, the switching of traffic from a given type of traffic source to a given type of traffic sink. Thus, a flexible switching network is available which is reconfigurable by software and can thus be used for nearly all switching tasks.

Further, the control unit CONTR may control a reconfiguration of the interconnection structure with a view to saving energy. This is conceivable mainly for the use of a switching network in communication satellites. The control unit would then configure a switching network which is as small as possible but sufficient for the current traffic load, and turn off the switching modules not needed.

The control unit CONTR may also consist of two or more smaller units. These units could also include parts of the switch unit SE.

The reconfiguration of the switching network will now be briefly explained by an example.

Figure 2:
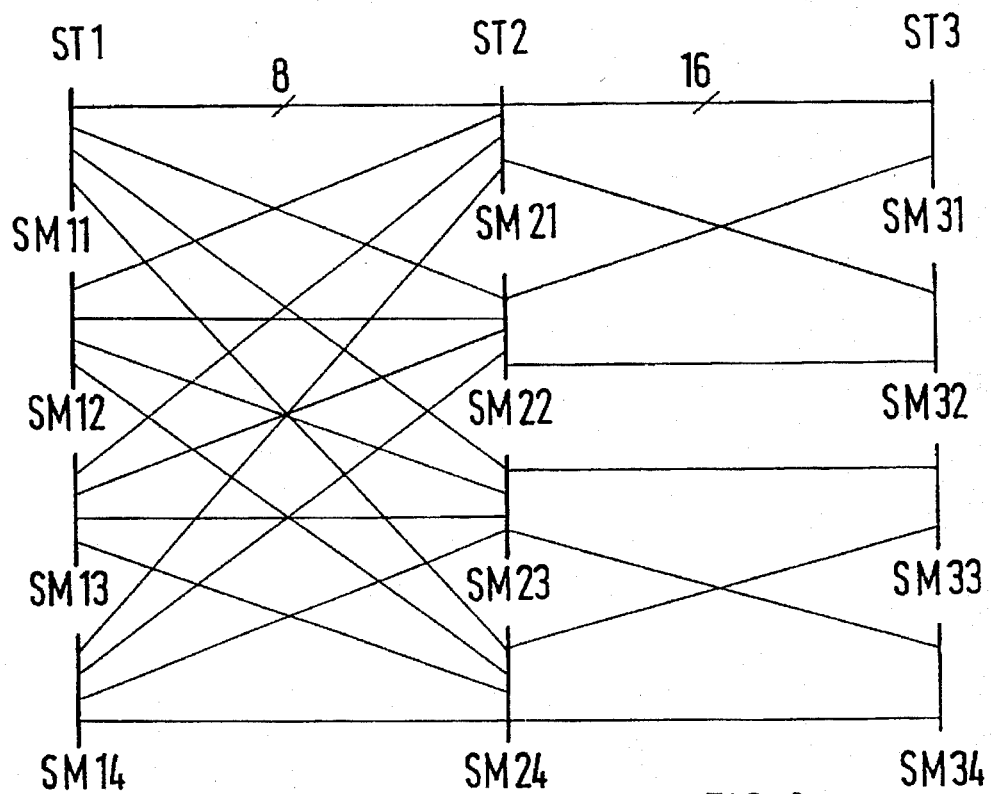
FIG. 2 is a symbolic representation of the interconnection structure of the switching network of FIG. 1.

FIG. 2 illustrates the (basic) interconnection structure of the switching network of FIG. 1. It shows the switching-network stages ST1 to ST3, which are formed by the switching modules SM11 to SM14, SM21 to SM24, and SM31 to SM34, respectively. Four groups of eight outlets of the switching module SM11 are connected to four groups of eight inlets of the switching modules SM21 to SM24, respectively. The outlets of the switching modules SM12 to SM14 are connected to the inlets of the switching modules SM21 to SM24 according to the same scheme. Two groups of 16 outlets of the switching module SM21 are connected to two groups of 16 inlets of the switching modules SM31 and SM32, respectively, and two groups of 16 outlets of the switching module SM22 are connected to two other groups of 16 inlets of the switching modules SM31 and SM32, respectively. The outlets of the switching modules SM23 and SM24 are connected to the inlets of the switching modules SM33 and SM34 according to the same scheme.

If, in a switching network with such an interconnection structure, the switching module SM21 fails, the maximum traffic load that can be carried by the switching modules SM31 and SM34 will decrease by 50%. To avoid this, the control unit CONTR will decide to reconfigure the interconnection structure. As an alternative interconnection structure, it will choose an interconnection structure as illustrated in FIG. 3, for example.

Figure 3:
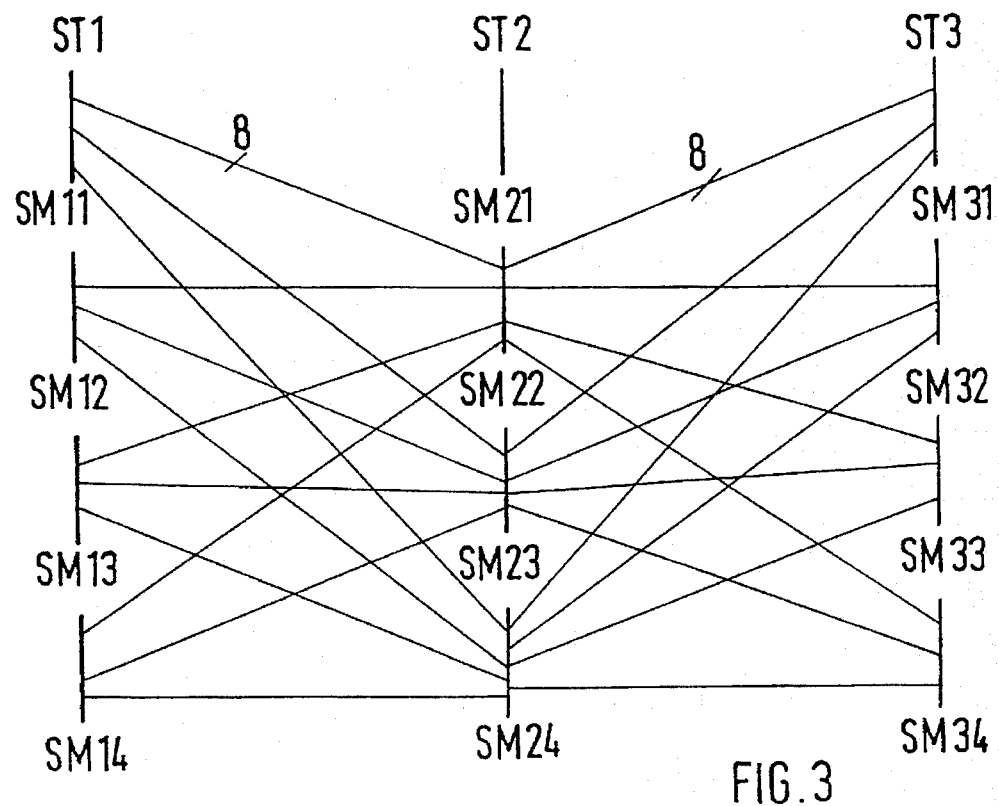
FIG. 3 is a symbolic representation of the reconfigured interconnection structure of the switching network of FIG. 1 after failure of a switching module.

FIG. 3 shows the switching-network stages ST1 to ST3 with the switching modules SM11 to SM14, SM21 to SM24, and SM31 to SM34, respectively. Three groups of eight outlets of each of the switching modules SM11 to SM14 are connected to the switching modules SM22 to SM24, respectively. Similarly, three groups of eight inlets of each of the switching modules SM31 to SM34 are connected to the switching modules SM22 to SM24, respectively.

The control unit CONTR controls the crosspoints of the two switch subunits SEP1 and SEP2 in such a way that the paths between the switching-network stages ST1 to ST3 are switched through in accordance with this new interconnection structure. In addition, the control unit changes the routing tables of the switching modules SM11 to SM14, SM22 to SM24, and SM31 to SM34 according to the new interconnection structure.

If the control unit CONTR is informed that the switching module SM21 or SM22 is overloaded, because traffic has to be switched mainly from the inlets of the switching module SM11 to the outlets of the switching module SM31, for example, the control unit CONTR will also decide to reconfigure the interconnection structure. In such a new interconnection structure, instead of groups of eight paths, groups of 12 paths, for example, are provided between the switching module SM11 and each of the switching modules SM21 and SM22. The new interconnection structure is thus as follows: Two groups of 12 outlets of the switching module SM11 are connected to two groups of 12 inlets of the switching modules SM21 and SM22, respectively, and two groups of 12 outlets of the switching module SM12 are connected to two groups of 12 inlets of the switching modules SM21 and SM22, respectively. Two groups of four outlets of the switching module SM11 are connected to two groups of four inlets of the switching modules SM23 and SM24, respectively, and two groups of four outlets of the switching module SM12 are connected to two groups of four inlets of the switching modules SM23 and SM24, respectively. Similarly, groups of four outlets of the switching modules SM13 and SM14 are connected to groups of four inlets of the switching modules SM21 and SM22, and groups of 12 outlets of the switching modules SM13 and SM14 are connected to groups of 12 inlets of the switching modules SM23 and SM24. The interconnection between the switching-network stages ST2 and ST3 corresponds to that of FIG. 2.

While the embodiment has been described with reference to the use of the method according to the invention in a three-stage switching network, it is to be understood that the invention is also applicable to multistage switching networks. In such multistage switching networks, it is possible to fundamentally change the characteristics of the switching network by changing the interconnection structure of the individual switching modules. By reconfiguring the interconnection structure, a switching network could be operated as a Banyan network, Batcher-Banyan network, or sorting network, for example. Also, a mixture of these network types, e.g., a sorting network and subsequently a Banyan network, could be produced. For all of these network types, only one type of hardware would be necessary.

What is claimed is:

1. A method of operating a switching network formed by a number of switching modules (SM11 to SM34) and an interconnect network between the switching modules (SM11 to SM34), characterized in that the interconnect network includes a switch unit (SE) and interconnects the switching modules (SM11 to SM34) in accordance with a changeable logic interconnection structure, and that said changeable logic interconnection structure is reconfigured by means of the switch unit (SE) as required.

2. A method as claimed in claim 1, characterized in that the changeable logic interconnection structure is reconfigured on the basis of data on the status of switching modules (SM11 to SM34).

3. A method as claimed in claim 1, characterized in that the changeable logic interconnection structure is reconfigured on the basis of data from an input device.

4. A switching network comprising a number of switching modules (SM11 to SM34) and an interconnect network between the switching modules (SM11 to SM34), characterized in that the interconnect network includes a switch unit (SE) for connecting input links (IN1, . . . , IN128) to output links (OUT1, . . . , OUT128), at least part of the switching modules (SM11 to SM34) are interconnected via the switch unit (SE) in accordance with a changeable logic interconnection structure, with each of said switching modules (SM11 to SM34) connected either to said input links (IN1, . . . , IN128) or to said output links (OUT1, . . . , OUT128) of the switch unit (SE), and the switch unit (SE) is adapted to reconfigure the changeable logic interconnection structure as required.

5. A switching network as claimed in claim 4, characterized in that the switch unit (SE) consists of two or more separate units (SEP1, SEP2).

6. A switching network as claimed in claim 4, characterized in that the switch unit (SE) contains optical switches for connecting said input links (IN1, ..., IN128) to output links (OUT1, ..., OUT128).

7. An exchange comprising a switching network which is provided with a number of switching modules (SM11 to SM34) and an interconnect network between the switching modules (SM11 to SM34), characterized in that the interconnect network includes a switch unit (SE) for connecting input links (IN1, ..., IN128) to output links (OUT1, ..., OUT128), at least part of the switching modules (SM11 to SM34) are interconnected via the switch unit (SE) in accordance with a changeable logic interconnection structure, with each of said switching modules (SM11 to SM34) connected either to said input links (IN1, ..., IN128) or to said output links (OUT1, ..., OUT128) of the switch unit (SE), and the switch unit (SE) is adapted to reconfigure the changeable logic interconnection structure as required.

* * * * *